United States Patent
Foresman et al.

(10) Patent No.: US 6,860,238 B1
(45) Date of Patent: Mar. 1, 2005

(54) CULVERT SHELVES TO ASSIST ANIMAL MIGRATION

(75) Inventors: Kerry R. Foresman, Missoula, MT (US); Cory W. Claussen, Missoula, MT (US)

(73) Assignee: The University of Montana, Missoula, MT (US)

( * ) Notice: Subject to any disclaimer, the term of this patent is extended or adjusted under 35 U.S.C. 154(b) by 0 days.

(21) Appl. No.: 10/754,682

(22) Filed: Jan. 9, 2004

Related U.S. Application Data

(60) Provisional application No. 60/439,237, filed on Jan. 9, 2003.

(51) Int. Cl.[7] .............................................. A01K 29/00
(52) U.S. Cl. ........................ 119/703; 119/485; 405/125
(58) Field of Search ................................ 119/485, 174, 119/703; 405/124–125

(56) References Cited

U.S. PATENT DOCUMENTS 6,413,015 B1 * 7/2002 Poirier et al. ............... 405/125

OTHER PUBLICATIONS

Kerry R. Foresman, Interim Report For: The Effects of Highways on Fragmentation of Small Mammal Populations and Modifications of Crossing Structures to Mitigate Such Impacts, Apr. 29, 2002.*

Foresman, Kerry R., Small Mammal Use of Modified Culverts on the Lolo South Project of Western Montana, abstract, Aug. 31, 2001.

Foresman, Kerry R., Monitoring Animal Use of Modified Drainage Culverts on the Lolo South Project, report, Nov. 2001, Montana Deptartment of Transportation, Helena, MT.

* cited by examiner

Primary Examiner—Teri P. Luu
Assistant Examiner—Kimberly S. Smith
(74) Attorney, Agent, or Firm—Saliwanchik, Lloyd & Saliwanchik

(57) ABSTRACT

Shelves suspended in culverts allow animals to move easily and safely under a highway. The shelves can be retrofitted to any existing culvert or can be part of a new, manufactured culvert. The shelves are removable so as not to impede water movement in times of high water or flood. The shelves are adapted to encourage all animals to use them as passageways under the highway. Ramps allow animals to access shelves. The shelf floor is mesh of the less than one inch to allow smaller animals to cross comfortably. The shelves are equipped with tubes to encourage small semi-fossorial animals to cross. The tubes provide covered protection from predators. Entrance funnels direct vole-like animals toward the tubes. The culvert shelves of the subject invention encourage animals to cross under the highway so that the highway no longer poses a barrier to these animals.

21 Claims, 3 Drawing Sheets

CULVERT SHELVES TO ASSIST ANIMAL MIGRATION

CROSS REFERENCE TO RELATED APPLICATIONS

This application claims priority to U.S. Provisional Patent Application Ser. No. 60/439,237, filed Jan. 9, 2003.

The subject invention was made with government support under a research project supported by the Montana Department of Transportation Grant Nos. M-28144 and M-27334. The government has certain rights in this invention.

BACKGROUND OF THE INVENTION

Expansion of the highway systems disrupts animal habitat and migration. Highways present a barrier to animals. Animals attempting to cross a highway subject themselves to potential death and can create a hazardous condition for the driving public. Disruptions in migration caused by refusing or being unable to cross the highway barrier cause population fragmentation. Culvert systems are installed in new roadways to prevent flooding and facilitate water passage. These culverts however remain dry much of the year and are used by many animals to safely cross the highway. At certain times of the year however, the presence of water in the culverts prevents small animals from passing. Further, certain animals do not use culverts for travel because the culverts do not present the proper environment for passage. Providing a safe pathway for year round movement of animals across a highway would preclude the need for animals to traverse the dangerous highway surface.

SUMMARY OF THE INVENTION

The shelves of the subject invention provide safe passageways for animals across a highway. The shelves are suspended within the culverts so animals can pass through the culvert even when water is present. The floor of the shelves are perforated to allow water to move in and around the shelves during periods of high water. Further, the shelves are configured to be easily installed and removed should unusually high water be anticipated. The shelves of the subject invention have ingress and egress ramps that extend from the shelf surface to the surrounding terrain so that all animals can access the shelves. The ramps are positioned toward the side of the culvert and dovetail into the terrain. Positioning the ramps to the side insures they do not impede water flow through the culvert. The shelves also support tubes to allow and encourage passage by smaller semi-fossorial animals. The tubes are flanked by access funnels which extend to surrounding vegetation. The funnels direct the small animals into the tube. The subject shelves can be retrofitted to existing culverts, and new culverts can be fitted with hardware to accept the shelves so that all culverts will offer a safe pathway for animals crossing the highway.

DETAILED DESCRIPTION OF THE INVENTION

The subject invention is a shelf that is placed in a culvert running under a highway. The shelf is configured to encourage a variety of animals to pass through the culvert and avoid crossing the dangerous highway.

Culverts are placed under roadways primarily to prevent new highways from flooding and to facilitate water passage beneath a roadway, and are therefore constructed to specific hydrological specifications. Culverts are not constructed with animal preference or behavior in mind. Thus, it is not surprising that use of a culvert by an animal as a passageway under a highway is inconsistent. The shelf of the subject invention adapts a culvert to make it a comfortable, safe passageway for small animals such as raccoons, skunks, weasels and house cats.

So as not to defeat the primary purpose of culverts, the shelves of the subject invention are configured to not impede the flow of water through the culvert. Culverts are many shapes and sizes but when installed are designed to run no more than one-half full of water. Therefore, the shelves of the subject invention are suspended within the culverts approximately above the one-half full diameter. In the exemplified embodiment, shelves are constructed for placement into corrugated metal culverts that are about four feet in diameter. Shelves are therefore suspended within this culvert approximately two feet off the culvert floor. The subject shelves comprise a frame member supporting a mesh floor, access ramps and a small animal tube with an entrance funnel to encourage use of the passageway by small semi-fossorial animals. The mesh floor of the shelves allow unexpected high water to flow through and past the shelf. Access ramps and entrance funnels angle toward the sides of the culvert out of the path of flowing water. The subject shelves adapt a culvert to encourage animals to use the culvert as a passageway but do not interfere with the primary purpose of the culvert which is to facilitate water flow under and around a highway.

Figure 1:
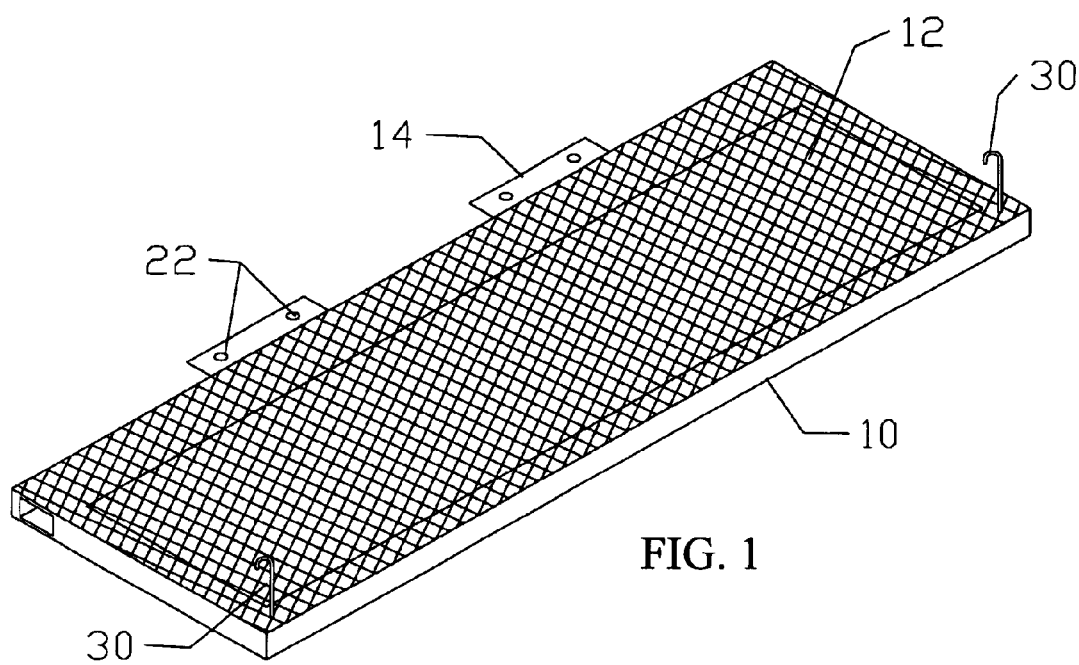
FIG. 1 shows a preferred embodiment of a frame member supporting a floor of the shelf of the subject invention.

A preferred embodiment of a frame member of the shelf of the subject invention is shown in FIG. 1. The frame member 10 which supports a mesh floor 12. In this embodiment, the shelves are made of steel. Steel L-bars and posts create a frame which supports a wire mesh floor. The weight of the steel prevents the shelves from being easily dislodged. Other materials are suitable for use in constructing the subject shelves. Other metals or composite materials offer the weight advantages of steel. Metals, such as aluminum, or plastics can offer other advantages. The floor of the shelves are steel mesh which add to the weight and stability of the shelf. Mesh material further allows water to pass through and over the shelf during, for example, spring run-off. Preferably, the mesh size is from about ¼ inch to about ¾ inch, and is most preferably ½ inch. A #13 flat galvanized expanded metal mesh is most preferable. The smaller openings of this mesh size appear to be more comfortable and reassuring for the animals crossing the shelf. Mesh sizes greater than one inch discourage smaller animals from crossing.

Figure 2:
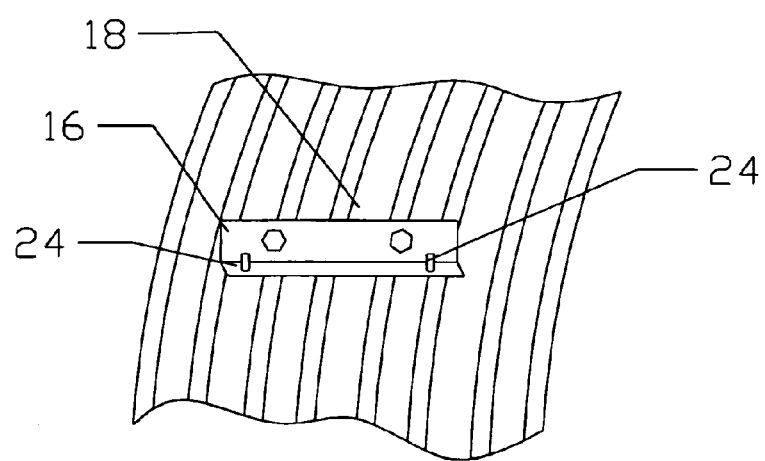
FIG. 2 shows a preferred embodiment of a bracket in a culvert to engage a lip of the shelf of the subject invention.
Figure 3:
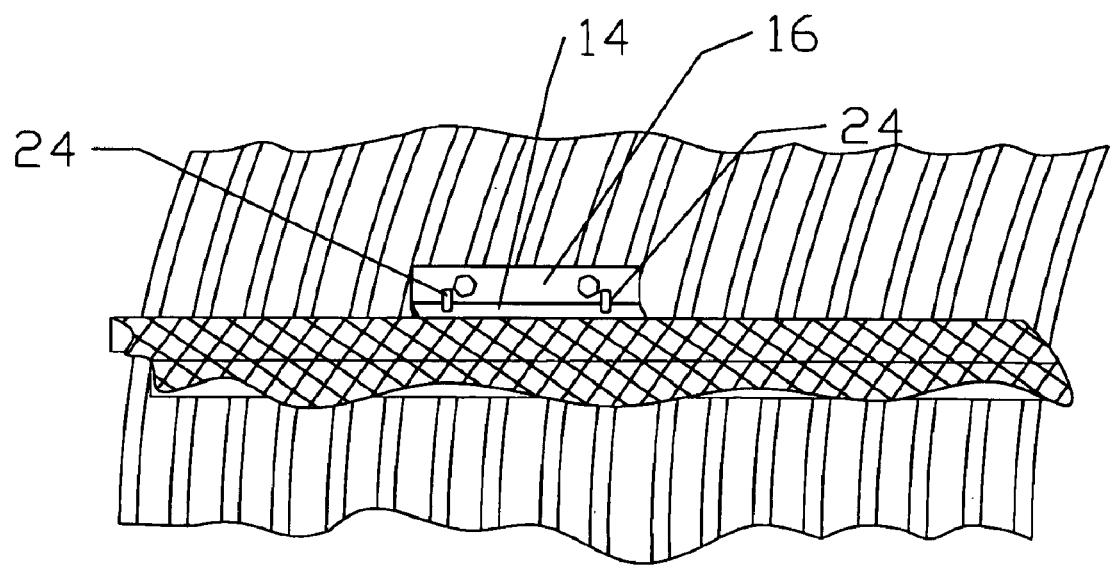
FIG. 3 shows a preferred embodiment of the shelf of the subject invention mounted in a culvert on the bracket shown in FIG. 2.

It is important that the shelves of the subject invention are easily installed and removed from the culverts. Removal may be necessary and advisable when a high spring run-off is expected. The subject shelves therefore are configured for easy access and rapid removal. In a preferred embodiment, a lip 14 on one edge of the shelf engages a bracket 16 permanently connected to a side 18 of the culvert 20. The brackets 16 (FIG. 2) are designed to attach to any culvert surface (concrete or metal) and to accommodate different sized corrugations in prefabricated metal culverts. The brackets are constructed in such a manner to allow easy installation and removal of shelf sections. In this embodiment, the lip has openings 22 which engage pins 24 on the bracket 16. Preferably, the opposite edge of the shelf is removably attached to the ceiling 26 of the culvert by hanging it from a support 28. Most preferably, the edge is suspended at each corner. In this embodiment, cable connectors are used to suspend the shelf from the culvert roof. The cable can be cut to length as needed for each particular culvert, depending upon culvert size and desired hanging elevation. Hooks 30 permanently attached to the shelf engage a loop 32 in a cable 34. A loop at the opposite end of the cable engages another hook, or support 28 permanently attached to the ceiling of the culvert. One skilled in the art would be aware of other suitable means by which to permanently or removably attach the subject shelves within the culverts. New culverts can be pre-fitted with mounting brackets welded in place so that shelves simply need to be hung. Existing culverts can be retrofitted with brackets using hardened steel self-tapping bolts.

Shelf sections are pieced to run horizontally along the length of the culvert. In particular, shelf sections can be from about nine feet to about six feet long and from about two feet to about three feet wide. In the exemplified embodiment, shelf sections comprising frame members are about eight feet long and about 25 inches wide. This allows the frame members to be constructed from stock steel and produces a section that is manageable size and weight for installation and removal by two persons. It is apparent however that shelves and frame members can be constructed in any size to fit any culvert.

Figure 4:
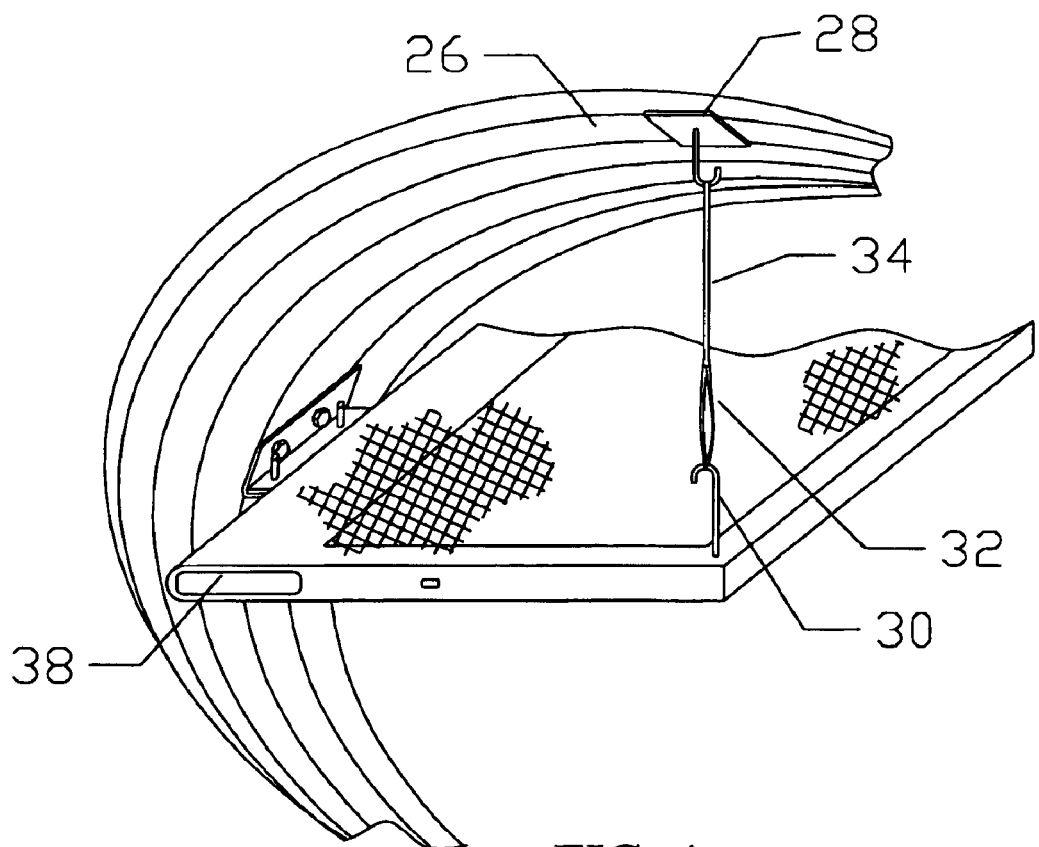
FIG. 4 shows a preferred embodiment of the shelf of the subject invention mounted in a culvert.
Figure 5:
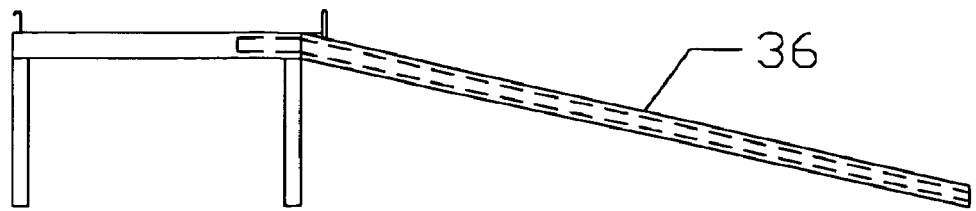
FIG. 5 shows a preferred embodiment of an access ramp of the shelf of the subject invention.
Figure 6:
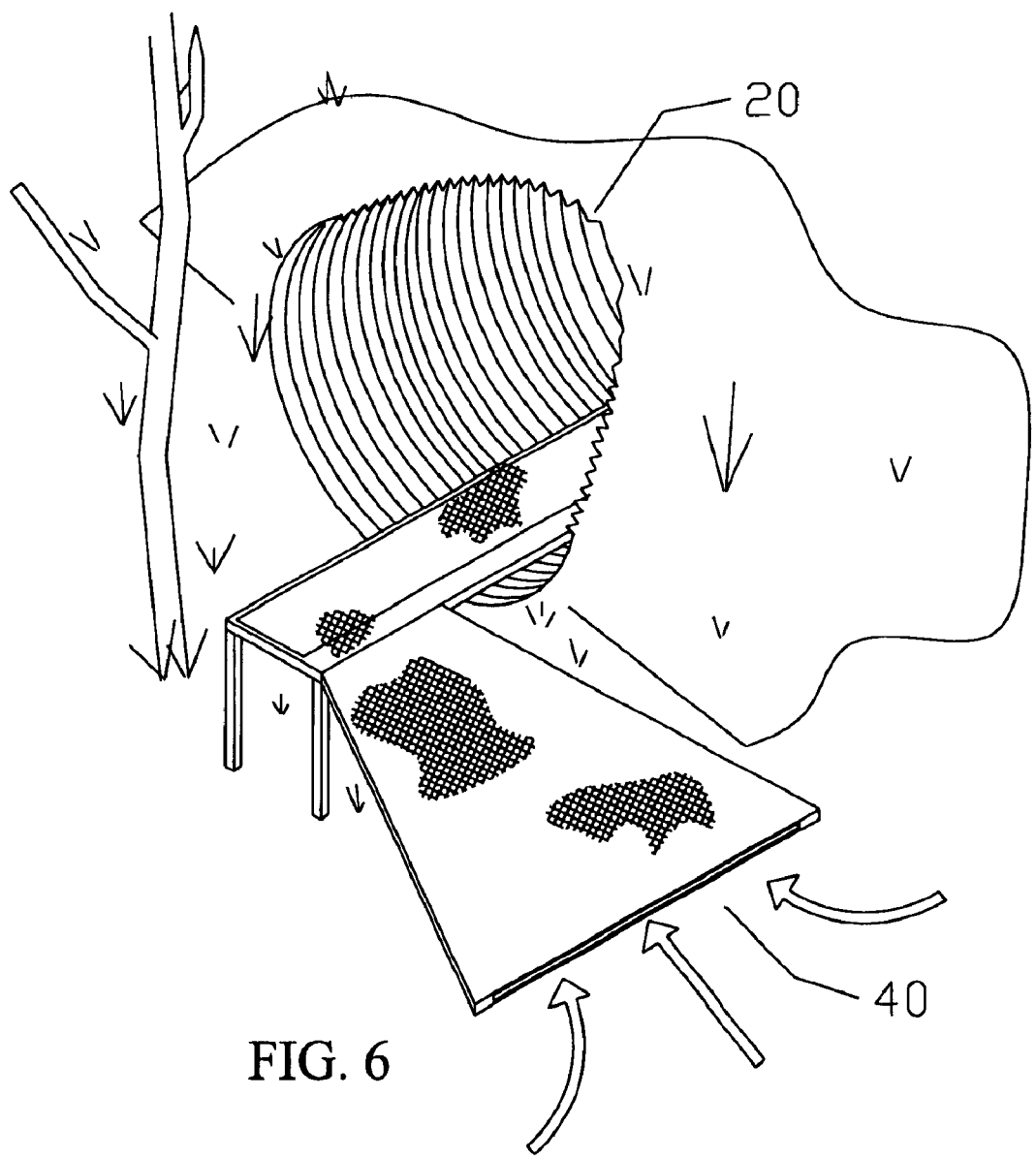
FIG. 6 shows a preferred embodiment of an entrance funnel of the shelf of the subject invention.

The shelves of the subject invention preferably have ramps 36 at each end of the culvert to help animals access the shelf. Some animals, for example skunks, cannot jump the two feet required to access the hanging shelves. Ingress and egress ramps provide access to the shelves for all animals. Preferably, the ramps are positioned toward the side of the culvert contouring to the land so as not to impede the flow of water through the culvert (FIG. 4). Ramps can be constructed similar to the frame members having the frame member's advantages of weight and water flow. Alternatively, the ramp 36 can be constructed of other materials which are suitable for animal passage and environmental conditions.

The culvert shelves of the subject invention further include a tube 38 for the passage of small vole-like animals. Very small animals, such as the meadow vole, move either underground or through dense ground vegetation. These animals avoid open areas as open areas expose them to predators. Additionally, negotiating even ¼ inch mesh is difficult for these small animals. Tubes associated with the shelves allow these animals to pass freely. The tubes mimic vegetative tunnels providing cover from predators. The tubes can be from about four inches to about eight inches wide and from about one inch to about three inches high, and most preferably is about six inches wide and about two inches high. The tubes are associated with entrance funnels 40 which lie close to the surrounding vegetation and direct the voles into the tubes. The entrance funnel 40 is low (e.g. 1–3 inches) providing the feeling of protection offered by the tubes yet direct the voles to the tube. The funnel, like the shelf ramp preferably are positioned to the side of the entrance of the culvert so as not to impede the flow of water through the culvert. In a particularly preferred embodiment, the entrance funnel 40 is combined with and lays under the access ramp 36. The combined entrance funnel/access ramp presents less congestion near the entrance of the culvert.

The following examples are offered to further illustrate but not limit both the apparatuses and methods of the present invention.

EXAMPLE 1

Animal Use of Culvert Shelves and Vole Tubes Over a Twenty-seven Month Period

Fourteen cameras in or adjacent to roadway culverts were used to monitor activity on a daily basis along a highway reconstruction project, termed the Lolo South Project, in west-central Montana expanding Hwy 93 from 2 lanes to 4 over a distance of approximately 45 miles over a twenty-seven period beginning Oct. 1, 2001 and ending Dec. 31, 2003. During this twenty-seven period, approximately 7,783 pictures were taken documenting 24 species using the culverts. Seventeen small mammal live-trapping session were conducted, for a total of 19,575 trap periods (1 trap period=1 trap set for 12 h) to document animal presence. Sherman live traps were set in transect lines adjacent to each culvert entrance.

TABLE 1

Species Using the Culvert Shelves

| | |
|---|---|
| Deer Mice | Columbian ground squirrels |
| Meadow voles | Vagrant shrews |
| Raccoons | Mountain cottontail rabbits |
| Short-tailed weasels | Mink |
| Striped skunks | Porcupines |
| Red squirrels | Fox squirrels |
| Muskrats | Painted turtles |

TABLE 2

Mammal Species Captured Adjacent to Culverts.

| Species | Relative Abundance |
|---|---|
| Meadow Voles | 1,328 |
| Deer Mice | 742 |
| Short-tailed Weasels | 26 |
| Vagrant Shrews | 81 |
| House Mice | 1 |
| Columbian Ground Squirrels | 38 |
| Striped Skunk | 1 |
| Western Jumping Mouse | 1 |

The role of vegetative cover at culvert entrances was also assessed as well as the effect of water level and traffic volume on animal use.

It should be understood that the examples and embodiments described herein are for illustrative purposes only and that various modifications or changes in light thereof will by suggested to persons skilled in the art and are to be included within the spirit and purview of this application and the scope of any appended claims.

What is claimed is:

1. A shelf in combination with a culvert to encourage an animal to travel through said culvert, the shelf comprising:
   at least one frame member supporting a floor;
   at least one ramp on each end hinged to said frame member extending from said culvert to provide access to said shelf by said animals;

a tube through which a small animal can travel, said tube supported by said frame member and comprising a funnel;

wherein said shelf is removably suspended in said culvert.

2. The shelf of claim 1, wherein said floor is mesh comprising openings of from about ¼ inch to about ¾ inch.

3. The shelf of claim 1, wherein said floor is mesh comprising openings of about ½ inch.

4. The shelf of claim 1, wherein said frame member comprises at least one lip on one side of said frame member and at least on fastening means on another side of said frame member and wherein said shelf is removably suspended in said culvert by engaging said lip to a bracket affixed to a side of said culvert and connecting said at least one fastening means to a ceiling of said culvert.

5. The shelf of claim 4, wherein said lip has holes to engage pins on said bracket.

6. The shelf of claim 4, comprising at least two fastening means placed opposite one another of said frame member.

7. The shelf of claim 4, wherein said fastening means is a hook to capture a loop in a cable suspended from said ceiling of said culvert.

8. The shelf of claim 1, wherein said frame member is rectangular.

9. The shelf of claim 8, wherein said frame member is from about six feet to about nine feet long and about two feet to about three feet wide.

10. The shelf of claim 8, wherein said frame member is about eight feet long and about 25 inches wide.

11. The shelf of claim 1, wherein said shelf comprises a plurality of frame members to span the length of said culvert.

12. The shelf of claim 1, wherein said tube is from about four inches to about eight inches wide and from about one inch to about three inches high.

13. The shelf of claim 1, wherein said tube is about six inches wide and about two inches high.

14. The shelf of claim 1, wherein said funnel is from about two inches to about four inches high.

15. The shelf of claim 1, wherein said funnel is about two inches high.

16. A culvert adapted to encourage an animal to travel through said culvert, the culvert comprising:

means to removably suspend a shelf inside said culvert; and a shelf, said shelf comprising:
at least one frame member supporting a floor;
at least one ramp on each end hinged to said frame member extending from said culvert to provide access to said shelf by said animals;
a tube through which a small animal can travel, said tube supported by said frame member and comprising a funnel.

17. The culvert of claim 16, wherein said frame member of said shelf comprises at least one lip on one side of said frame member and at least on fastening means on another side of said frame member and wherein said shelf is removably suspended in said culvert by engaging said lip to a bracket affixed to a side of said culvert and connecting said at least one fastening means to a support on a ceiling of said culvert.

18. The culvert of claim 17, wherein said lip has holes to engage pins on said bracket.

19. The culvert of claim 17, wherein said shelf comprises at least two fastening means placed opposite one another on said frame member.

20. The culvert of claim 17, wherein said fastening means on said shelf is a hook to capture a loop in a cable suspended from said support of said ceiling of said culvert.

21. The culvert of claim 16, wherein said floor of said shelf is mesh comprising openings of from about ¼ inch to about ¾ inch.

* * * * *

UNITED STATES PATENT AND TRADEMARK OFFICE
CERTIFICATE OF CORRECTION

PATENT NO. : 6,860,238 B1
DATED : March 1, 2005
INVENTOR(S) : Foresman

It is certified that error appears in the above-identified patent and that said Letters Patent is hereby corrected as shown below:

Column 5,
Line 19, "of" should read -- on --;

Column 6,
Line 19, the first occurrence of "on" should read -- one --

Signed and Sealed this

Twenty-fourth Day of May, 2005

JON W. DUDAS
*Director of the United States Patent and Trademark Office*